US008649309B2

(12) United States Patent
Kim et al.

(10) Patent No.: US 8,649,309 B2
(45) Date of Patent: Feb. 11, 2014

(54) APPARATUS AND METHOD FOR CREATING DATA PATH FOR BROADCASTING SERVICE IN CELLULAR NETWORK

(75) Inventors: Ki-Back Kim, Seongnam-si (KR); Han-Kyung Lee, Yongin-si (KR); Sung-Man Kim, Suwon-si (KR); Nae-Hyun Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1301 days.

(21) Appl. No.: 12/357,005

(22) Filed: Jan. 21, 2009

(65) Prior Publication Data

US 2009/0190518 A1    Jul. 30, 2009

(30) Foreign Application Priority Data

Jan. 24, 2008  (KR) .................. 10-2008-0007706
Mar. 3, 2008  (KR) .................. 10-2008-0019818
Sep. 11, 2008  (KR) .................. 10-2008-0089769

(51) Int. Cl.
*H04H 20/71*    (2008.01)

(52) U.S. Cl.
USPC .......................................... 370/312; 370/401

(58) Field of Classification Search
None
See application file for complete search history.

(56) References Cited

U.S. PATENT DOCUMENTS

| | | | |
|---|---|---|---|
| 7,190,680 B2 * | 3/2007 | Lim .............................. | 370/312 |
| 2007/0249333 A1 * | 10/2007 | Hwang et al. .............. | 455/422.1 |
| 2008/0108321 A1 * | 5/2008 | Taaghol et al. ............... | 455/410 |
| 2008/0253322 A1 * | 10/2008 | So et al. ......................... | 370/329 |
| 2009/0168754 A1 * | 7/2009 | Shan .............................. | 370/352 |
| 2009/0207773 A1 * | 8/2009 | Feng et al. ..................... | 370/312 |
| 2009/0213810 A1 * | 8/2009 | Shousterman et al. ....... | 370/331 |
| 2009/0238107 A1 * | 9/2009 | Li et al. .......................... | 370/312 |
| 2010/0046400 A1 * | 2/2010 | Wu et al. ....................... | 370/256 |
| 2010/0046410 A1 * | 2/2010 | So et al. ......................... | 370/312 |
| 2010/0315985 A1 * | 12/2010 | Moon et al. .................... | 370/312 |
| 2011/0116500 A1 * | 5/2011 | Petry et al. ..................... | 370/389 |

FOREIGN PATENT DOCUMENTS

| | | |
|---|---|---|
| JP | 2002-051006 A | 2/2002 |
| JP | 2005-136502 A | 5/2005 |
| JP | 2005-223718 A | 8/2005 |
| JP | 2006-522569 A | 9/2006 |
| JP | 2007-013977 A | 1/2007 |
| JP | 2008-529447 A | 7/2008 |
| JP | 2009-500971 A | 1/2009 |

* cited by examiner

*Primary Examiner* — Hassan Kizou
*Assistant Examiner* — Roberta A Shand
(74) *Attorney, Agent, or Firm* — Jefferson IP Law, LLP

(57) ABSTRACT

An apparatus and method for creating a data path for a broadcasting service in a cellular network is provided. In a method for creating a data path to provide a broadcasting service in a cellular network, a broadcast server transmits a session start request message to an Access Service Network-GateWay (ASN_GW) before transmission of Multicast and Broadcast Service (MBS) data, to request a multicast connection setup. The ASN_GW establishes a multicast connection between the broadcast server and the ASN_GW on the basis of information of the session start request message. The ASN_GW transmits a session start response message to the broadcast server in response to the session start request message, after establishment of the multicast connection between the broadcast server and the ASN_GW. The ASN_GW transmits a path registration request message to at least one base station associated with a broadcast zone, to request MBS data path establishment and air resource reservation. The base station establishes a multicast connection between the ASN_GW and the base station on the basis of information of the path registration request message. The base station transmits a path registration response message to the ASN_GW in response to the path registration request message, after establishment of the multicast connection between the ASN_GW and the base station.

22 Claims, 9 Drawing Sheets

APPARATUS AND METHOD FOR CREATING DATA PATH FOR BROADCASTING SERVICE IN CELLULAR NETWORK

PRIORITY

This application claims the benefit under 35 U.S.C. §119(a) of a Korean patent application filed in the Korean Intellectual Property Office on Jan. 24, 2008 and assigned Ser. No. 10-2008-0007706, a Korean patent application filed in the Korean Intellectual Property Office on Mar. 3, 2008 and assigned Ser. No. 10-2008-0019818, and a Korean patent application filed in the Korean Intellectual Property Office on Sep. 11, 2008 and assigned Ser. No. 10-2008-0089769, the entire disclosures of each of which are hereby incorporated by reference.

BACKGROUND OF THE INVENTION

1. Field of the Invention

The present invention relates to an apparatus and method for providing a Multicast and Broadcast Service (MBS) in a cellular network. More particularly, the present invention relates to an apparatus and method for creating/releasing/modifying a data path for a broadcasting service between network entities.

2. Description of the Related Art

As known in the art, conventional communication systems were originally developed to provide voice communication services. As technology has evolved, communication systems now provide data services and various multimedia services in addition to the voice communication services. However, the conventional communication systems, which were developed to provide only voice communication services, have a narrow bandwidth for data transmission and have a high subscription fee. For these reasons, they cannot satisfy diversified user demands. Furthermore, in conjunction with the rapid development in the communication industry and ever-increasing demands for Internet services, it is important to provide communication systems capable of providing Internet services efficiently. As a result of these trends, Broadband Wireless Access (BWA) systems having a bandwidth large enough to both satisfy the increasing user demands and provide efficient Internet services have been proposed.

The standardization of wireless access schemes for BWA systems is being conducted by the Institute of Electrical and Electronics Engineers (IEEE), which is an international standardization organization. More particularly, the standardization of wireless access schemes for BWA systems is being conducted by the IEEE 802.16 standardization group. Because the BWA systems have a larger bandwidth than conventional wireless communication systems for voice communication services, they can transmit a greater amount of data for a limited period of time and share all user channels (or resources) for efficient channel utilization. In addition, since Quality of Service (QoS) features are guaranteed, users can be provided with various services of different qualities depending on the characteristics of the services.

Examples of principal services of the BWA systems are Internet services, Voice over Internet Protocol (VoIP) services, and nonreal-time streaming services. Recently, a Multicast and Broadcast Service (MBS) has emerged as a real-time broadcasting service. The MBS provides a high transmission rate using a macro diversity scheme and thus can simultaneously provide various channels such as high-definition video and high-definition audio. Herein, the macro diversity scheme is used to transmit the same data for each MBS zone through the same resources at the same time.

Recently, various standards for a broadcasting service have been provided but a specific scheme for data path creation for transmission of broadcast contents has not yet been defined. For transmission of broadcast contents, a data path must be created between a network entity in a Core Service Network (CSN) and a network entity in an Access Service Network (ASN) before the start of a broadcast. What is therefore desired is a specific scheme for creating/releasing/modifying the data path.

SUMMARY OF THE INVENTION

An aspect of the present invention is to address at least the above problems and/or disadvantages and to provide at least the advantages described below. Accordingly, an aspect of the present invention is to provide an apparatus and method for creating/releasing/modifying a data path for a broadcasting service in a cellular network.

Another aspect of the present invention is to provide an apparatus and method for creating a data path for a broadcasting service before a start of a broadcast in a cellular network providing a broadcasting service.

Still another aspect of the present invention is to provide an apparatus and method for creating a data path for a broadcasting service between a MultiCast and BroadCast Service (MCBCS) server and an Access Service Network-GateWay (ASN_GW) using Internet Group Management Protocol (IGMP) in a cellular network providing a broadcasting service.

Even another aspect of the present invention is to provide an apparatus and method for creating a data path for a broadcasting service between an ASN_GW and a Base Station (BS) using IGMP in a cellular network providing a broadcasting service.

Yet another aspect of the present invention is to provide an apparatus and method for creating/releasing/modifying a data path on a Multicast and Broadcast Service (MBS) zone (broadcast zone) basis in a cellular network providing a broadcasting service.

In accordance with an aspect of the present invention, a method for providing a broadcasting service in a cellular network is provided. The method includes transmitting a session start request message from a broadcast server to an ASN_GW before transmission of MBS data, to request a multicast connection setup, establishing, by the ASN_GW, a multicast connection between the broadcast server and the ASN_GW on the basis of information of the session start request message, transmitting a session start response message from the ASN_GW to the broadcast server in response to the session start request message, after establishment of the multicast connection between the broadcast server and the ASN_GW, transmitting a path registration request message from the ASN_GW to at least one base station associated with a broadcast zone, to request MBS data path establishment and air resource reservation, establishing, by the base station, a multicast connection between the ASN_GW and the base station on the basis of information of the path registration request message, and transmitting a path registration response message from the base station to the ASN_GW in response to the path registration request message, after establishment of the multicast connection between the ASN_GW and the base station.

In accordance with another aspect of the present invention, a method for providing a broadcasting service in a cellular network is provided. The method includes transmitting a session release request message from a broadcast server to an ASN_GW after transmission of MBS data, to request a multicast connection release, releasing, by the ASN_GW, a multicast connection between the broadcast server and the ASN_GW on the basis of information of the session release request message, transmitting a session release response message from the ASN_GW to the broadcast server in response to the session release request message, after release of the multicast connection between the broadcast server and the ASN_GW, transmitting a path deregistration request message from the ASN_GW to at least one base station associated with a broadcast zone, to request MBS data path deregistration and air resource release, releasing, by the base station, a multicast connection between the ASN_GW and the base station on the basis of information of the path deregistration request message, and transmitting a path deregistration response message from the base station to the ASN_GW in response to the path deregistration request message, after release of the multicast connection between the ASN_GW and the base station.

In accordance with still another aspect of the present invention, a method for providing a broadcasting service in a cellular network is provided. The method includes transmitting a session modification request message from a broadcast server to an ASN_GW after establishment of a path for an MBS, changing, by the ASN_GW, a parameter information of a broadcast channel in response to the session modification request message, transmitting a session modification response message from the ASN_GW to the broadcast server in response to the session modification request message, transmitting a path modification request message from the ASN_GW to at least one base station associated with an MBS zone serving the broadcast channel, transmitting a path modification response message from the base station to the ASN_GW in response to the path modification request message, to change the parameter information of the broadcast channel.

In accordance with still another aspect of the present invention, a method for operating an ASN_GW for a broadcasting service in a cellular network is provided. The method includes receiving a session start request message from a broadcast server before transmission of MBS data, establishing a multicast connection between the broadcast server and the ASN_GW on the basis of information of the session start request message, transmitting a session start response message to the broadcast server in response to the session start request message, transmitting a path registration request message to at least one base station associated with a broadcast zone after establishment of the multicast connection, to request MBS data path establishment and air resource reservation, and receiving a path registration response message, which notifies data path establishment between the base station and the ASN_GW, from the base station.

In accordance with yet another aspect of the present invention, an apparatus for an ASN_GW for a broadcast service in a cellular network is provided. The apparatus includes a first interface for communicating with a broadcast server, a second interface for communicating with a base station, and a controller for controlling the first interface to establish a multicast connection between the broadcast server and the ASN_GW upon receipt of a session start request message from the broadcast server, for transmitting a session start response message to the broadcast server, for controlling the second interface to transmit a path registration request message to base stations associated with a broadcast zone, and for receiving a path registration response message, which notifies the establishment of a data path the base station and the ASN_GW, from the base stations.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description when taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1:
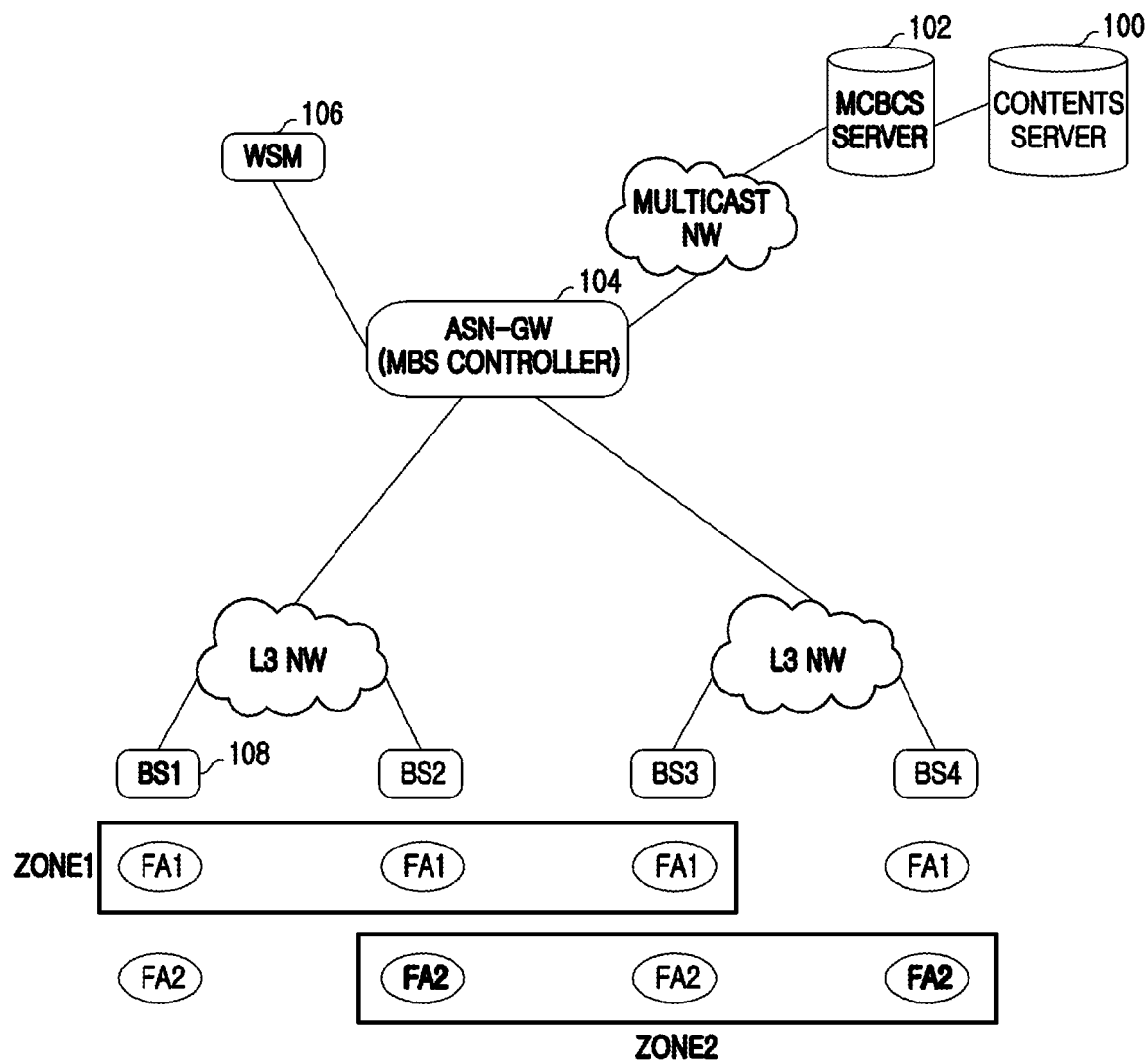
FIG. 1 is a diagram illustrating a network structure according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein may be made without departing from scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention are intended to provide a scheme for creating/releasing/modifying a data path for a broadcasting service between network entities in a cellular network providing a broadcasting service.

In the following description, a broadcasting service may also be referred to as a Multicast and Broadcast Service (MBS), a MultiCast and BroadCast Service (MCBCS), a Multimedia Broadcast and Multicast Service (MBMS), or a BroadCast/MultiCast Service (BCMCS) depending on the intentions of operators and standardization groups.

In addition, the name of a Network Entity or a Network Element (NE) is defined according to its function and may vary depending on the intentions of the operators or the standardization groups. For example, a Base Station (BS) may also be referred to as an Access Point (AP), a Radio Access Station (RAS), or a Node-B. Also, an Access Service Network-GateWay (ASN_GW) may be referred to as a Radio Network Controller (RNC), a Base Station Controller (BSC), or an Access Control Router (ACR). Herein, the ASN_GW may serve as not only a BSC but also a router.

The following description is made in the context of a broadband wireless communication system based on Orthogonal Frequency Division Multiplexing/Orthogonal Frequency Division Multiple Access (OFDM/OFDMA). However, it is to be understood that this is merely for the sake of the convenience and that the present invention is not limited to an OFDM/OFDMA-based system. Thus, it should be clearly understood that the present invention is also applicable to any other wireless communication system that provides a broadcasting service.

FIG. 1 is a diagram illustrating a network structure according to an exemplary embodiment of the present invention.

Referring to FIG. 1, the network includes a contents server 100, an MCBCS server 102, an ASN_GW 104, a WiBro System Manager (WSM) 106, and a BS 108. Herein, the ASN_GW 104 and the BS 108 may constitute an Access Service Network (ASN).

The contents server 100 generates/stores broadcast contents, and registers the contents in the MCBCS server 102 through an application layer protocol (e.g., HyperText Transfer Protocol (HTTP)) before broadcasting the contents. Herein, the contents server 100 may transmit at least one of a content type, a service bit rate, a service time, and a service zone to the MCBCS server 102.

The MCBCS server 102 has an interface with the external contents server 100 and an Authentication, Authorization and Accounting (AAA) server (not illustrated). The MCBCS server 102 transmits at least one of broadcast traffic and MBS zone management information to the ASN, and transmits at least one of a service guide (including a broadcast schedule and a mapping table) and a content-by-content service authority key to a user terminal. Herein, the MCBCS server 102 and the user terminal communicate through an application layer protocol (e.g., HTTP). When a content registration request is received from the contents server 100 through the application layer protocol (e.g., HTTP), the MCBCS server 102 allocates at least one of a broadcast channel multicast Internet Protocol (IP) address (or unicast IP address) and a content ID to each content. Also, the MCBCS server 102 maps at least one of a content ID, a multicast IP address, a service time (e.g., a transmission date and a transmission time), a data rate, a Multicast Connection IDentifier (MCID), an MBS zone ID, and a transmission zone ID to each content and stores the same in a DataBase (DB). The DB is used to transmit various signaling data and IP packets to the ASN_GW 104. In addition, the MCBCS server 102 transmits broadcast contents from the contents server 100 to the ASN according to a broadcast schedule table. The MCBCS server 102 may transmit air scheduling information about a broadcasting service (e.g. a permutation scheme, a Modulation and Coding Scheme (MCS) level, an indication of the use of Multiple Input Multiple Output (MIMO), a data rate, a transmission period, an indication of the use of compression, a broadcast start/end time and the like) to the ASN. In another embodiment, the air scheduling information may be transmitted from the WSM 106 (or an Element Management System (EMS) or an Operation and Maintenance Center (OMC)) to the ASN.

The ASN_GW 104 transmits traffic from a core network to the BS 108, and transmits traffic from the BS 108 to the core network. The ASN_GW 104 manages at least one of a Service Flow (SF), connection, and mobility of each user terminal. Herein, a unique SF may be generated for each of UpLink (UL) and DownLink (DL) connections. In addition, the ASN_GW 104 has an interface with a Core Service Network (CSN), such as an AAA server. An MBS controller is included in an access service network (e.g., a functional block in the ASN GW). The MBS controller performs data/time synchronization on broadcast traffic from the MCBCS server 102, and multicasts the data/time-synchronized broadcast traffic to BSs in the same MBS zone. The functions of the MBS controller may be classified into two functions, namely an MBS proxy function, which covers signaling, and an MBS Data Path Function (DPF), which covers a broadcast traffic processing function including a synchronization function.

The BS 108 has an air interface with a user terminal, and transmits broadcast contents from the MBS controller of the ASN_GW 104 through a preset resource at a preset time. Herein, if macro diversity is supported for a broadcasting service, BSs in the same MBS zone may broadcast the same content through the same resource at the same time.

The WSM 106 performs maintenance/repair on network entities, and transmits Program Loading Data (PLD) for initialization of the ASN_GW 104 and the BS 108 to the corresponding network entities. Although not illustrated in FIG. 1, an MCBCS OMC may also be provided as a network manager to manage the MCBCS server 102. Depending on the network structures, a network manager managing the ASN_GW 104 and the BS 108 may be divided into three network managers, namely an ASN_GW OMC, a BS OMC, and an upper OMC managing both the ASN_GW OMC and the BS OMC. The ASN_GW OMC and the upper OMC may be united into an integrate OMC. Herein, it is assumed that the integrate OMC is provided for each Network Access Provider (NAP) or for each ASN. The MCBCS server 102 may transmit configuration information through the integrate OMC to the ASN. Herein, it is assumed that there is no interface between the MCBCS OMC and the ASN.

A user terminal (not illustrated) is an entity that is provided with a broadcasting service. The user terminal receives a service guide (including at least one of a broadcast schedule and a mapping table) from the MCBCS server 102 through an application layer and stores the received service guide in order to receive broadcast traffic and change/delete a channel, even when the user terminal is in an idle mode. Upon receiving a service guide request from a user terminal, the MCBCS server 102 determines whether the user terminal is a broadcasting service subscriber terminal through an authentication process. If the user terminal is a broadcasting service subscriber terminal, the MCBCS server 102 transmits the service guide to the user terminal. Herein, the service guide may include at least one of a broadcast schedule (including at least one of a broadcast time and a data rate), a broadcast channel IP address, an MCID, an MBS zone ID, a content ID, and an encryption key. The user terminal may use a broadcasting message (e.g., a Downlink Channel Descriptor (DCD)) to identify an MBS zone to which the user terminal belongs.

Meanwhile, the broadcasting service may be classified into a broadcast service and a multicast service according to whether the user terminal joins the Internet Group Management Protocol (IGMP). If the user terminal joins the IGMP, the broadcasting service may be classified as the multicast service, and if not, the broadcasting service may be classified as the broadcast service.

In addition, the multicast service may be subclassified into one of a dynamic multicast mode and a static multicast mode. The dynamic multicast mode switches between a broadcast and a unicast according to the number of users receiving a broadcast channel. The static multicast mode does not perform the above switching operation, but turns off a broadcast if there is no user receiving a broadcast channel. The broadcast service broadcasts a preset broadcast channel at a preset time.

Meanwhile, the broadcasting service may be classified into one of a static MBS transmission mode and a dynamic MBS transmission mode according to whether the user terminal joins the IGMP and whether resource allocation on a wireless section (an R1 interface) changes between the start and end of a broadcast. If classification of the broadcasting service into one of static MBS transmission mode and a dynamic MBS transmission mode does not depend on whether the user terminal joins the IGMP and if the resource allocation does not change, the broadcasting service may be classified as the static MBS transmission mode. On the other hand, if classification of the broadcasting service into one of static MBS transmission mode and a dynamic MBS transmission mode depends on whether the user terminal joins the IGMP or if the resource allocation changes, the broadcasting service may be classified as the dynamic MBS transmission mode. Herein, the resource allocation state of each MBS zone may change depending on the time, that is, the resource allocation state may change at the start of a broadcast with a new broadcast configuration after the end of a broadcast, but such a case is assumed to be not considered.

Although not illustrated in FIG. 1, the core service network may include a policy server and an AAA server.

The AAA server manages authentication/accounting information and may include a Subscription Profile Repository (SPR) function that manages subscriber-by-subscriber profile information. In addition, the AAA server may manage at least one of subscriber-by-subscriber broadcast service authority information, a lifetime and a security key derived from the initial authentication. The policy server provides policy information (e.g., QoS policy information), determined by a service provider (or operator), to the corresponding network entity. Herein, the policy server may be provided in the MCBCS server 102, may be provided in other network entities, or may be provided as a separate server.

BSs associated with the same MBS zone register in a multicast group through the IGMP, and an ASN_GW multicasts a broadcast packet to the corresponding BSs through a multicast IP address (multi-BS MBS). That is, a BS may receive an MBS packet from a master ASN_GW (or an anchor ASN_GW) in the corresponding MBS zone, not from an ASN_GW controlling the BS. Herein, the BS receives IGMP triggering from an ASN_GW to which the BS belongs. Meanwhile, the MCBCS server 102 also transmits broadcast traffic to the ASN_GW 104 in a multicast mode. Herein, in order to receive a multicast packet, the ASN_GW 104 transmits an IGMP message to the MCBCS server 102 to enable a receiving function for a specific multicast address. In general, because the ASN_GW 104 and the MCBCS server 102 are not adjacent to each other, the IGMP message is not directly transmitted to the MCBCS server 102 but is transmitted to a multicast router connected to the MCBCS server 102.

Herein, a broadcast zone-based identifier in the ASN is an MBS zone ID, and a subcell-based identifier is a BS IDentifier (BSID). In addition, it is assumed that the data path of an R6 interface differs depending on the MBS zone even for the same broadcast content. The reason for this is that timing stamping and packetization for a multi-BS MBS is performed by a master ASN_GW of an MBS zone.

As described above, a separate server function is used for an MCBCS service. In an exemplary embodiment of the present invention, a server function provided in a Network Access Provider (NAP) is referred to as an MBS server, and a server function provided in a Network Service Provider (NSP) is referred to as an MCBCS server. If the NAP and the NSP are identical, the MBS server and the MCBCS server may be integrated into one server. Herein, it is assumed that BS grouping, that is, MBS zone-based BSID allocation is performed by an integrated OMC or an MBS server located in the NAP.

If an MCBCS server is present for each of several NSPs, NAP sharing may be performed as follows. Each NSP notifies desired broadcast zone information (e.g., a region code and an MBS zone ID) and broadcast channel configuration information (e.g., a channel identifier (or a content ID or an IP layer identifier), a data rate, a service time, and a service quality) to an MBS server. The MBS server synthetically analyzes NAP resources and information received from MCBCS servers, efficiently determines a Multicast Connection IDentifier (MCID) and air scheduling, and notifies the determination to each MCBCS server. If each MCBCS server determines all of an MBS zone ID, an MCID, and air scheduling, the NAP and the NSPs negotiates on an off-line basis so that MBS zone IDs do not overlap each other. If the NAP corresponds to one of the NSPs, the MBS server is included in the MCBCS server, so that the MCBCS servers of the different NSPs communicate with the MCBCS server of the NAP to perform the above functions. In another exemplary embodiment, there may not be a separate MBS server, and the NAP and the NSPs configure at least one of an MBS zone ID, an anchor ASN_GW MCBCS DPF, and an MCID on an off-line basis to perform a broadcasting service.

In addition, it is assumed that BS grouping (BSID list) for each MBS zone, that is, MBS zone-based BSID allocation is performed by an integrated OMC or an MBS server located in an NAP domain. Also, it is assumed that a BSID list mapped to an MBS zone is beforehand configured by a service provider.

Although there are many NSPs in a CSN, if an NAP corresponds to one of the NSPs, an MBS server function may be included in an MCBCS server of the NSP owned by the NAP. The MCBCS server including an MBS server function is located at the boundary between the CSN and the NAP network, and the MCBCS servers of the other NSPs may communicate with the MCBCS server of the NSP owned by the NAP.

A data path between network entities, located in an ASN and a CSN, should be efficiently created, released and modified in order to provide a radio broadcasting service in a cellular network. Hereinafter, a detailed description will be given of a method for creating, releasing and modifying the data path. Hereinafter, it is assumed that if an MBS zone configuration for each BS does not change, the BS does not perform an IGMP join/leave operation on an R6 interface. That is, it is assumed that if an MBS zone configuration does not change even in the event of a change in a broadcast channel configuration within an MBS zone (i.e., if the same MBS zone ID is maintained for a BS), the BS does not perform an IGMP leave operation. In an exemplary embodiment of the present invention, a data path for a broadcasting service is created by a static path establishment method based on configuration or by a dynamic path establishment method based on signaling before the start of a broadcast. The static path establishment method and the dynamic path establishment method are compared in Table 1 below.

TABLE 1

|  | Static Path Establishment (Configuration Based) | Dynamic Path Establishment (Signaling Based) |
|---|---|---|
| Advantages | Eliminates a signaling overhead between network entities for data path creation/release (between ASN_GW and BS, and between MCBCS server and ASN_GW). Eliminates an abnormal condition that may occur in signaling. The scenario is easy to introduce. If desired, can be operated by the ASN_GW OMC without interaction between the MCBCS server and the integrate OMC. | The MCBCS server can dynamically control data path creation. Easy to change the configuration. Similar in direction to the standard. |
| Disadvantages | Different in direction from the standard. Not easy to change the configuration by the OMC. | Signaling overhead Abnormal condition may occur in signaling. |
| Service views | Suitable if a broadcast schedule is preset. Suitable for emergency/disaster broadcasts (it is easy to process in real time if various IDs are fixed for use). | Suitable if various IDs are not preset, and a broadcast schedule cannot be preset. |

A description will first be given of the static path establishment method.

The static path establishment method provides a broadcasting service by using configuration information preset in the BS and the ASN_GW. An interaction between the MCBCS server and the OMC is performed to beforehand configure information for a broadcasting service in the BS and the ASN_GW. Thereafter, upon receiving multicast traffic (i.e., broadcast traffic) from the MCBCS server at the corresponding broadcast time, the ASN_GW uses information such as an R6 multicast IP address and a preset Generic Routing Encapsulation (GRE) key (e.g., an MBS zone ID and an MCID) to multicast the broadcast traffic to BSs associated with an MBS zone. Herein, an R6 interface is an interface between the ASN_GW and the BS, and an R3 interface is an interface between the MCBCS server and the ASN_GW. That is, the ASN_GW performs an IGMP join operation for receiving multicast traffic through the R3 interface, and multicasts the multicast traffic from the MCBCS server through the R6 interface to the BSs.

The configuration information preset in the BS and the ASN_GW is illustrated in Table 2 below.

TABLE 2

| ASN_GW | BS |
|---|---|
| R3 broadcast channel IP address | R6 multicast IP address |
| MBS zone ID, MCID, Broadcast service start/end time | MBS zone ID, MCID, Broadcast service start/end time |
| Air scheduling information for each MBS zone | Air scheduling information for each MBS zone |
| Air scheduling information for each MCID | Air scheduling information for each MCID |
| Air scheduling information for MBS MAP message | Air scheduling information for MBS MAP message |
| GRE key | GRE key |
| Network element address on which ASN_GW is to perform IGMP join & leave operation | Network element address on which BS is to perform IGMP join & leave operation |
| Transmission type (e.g., Single-BS MBS and Multi-BS MBS) | Transmission type (e.g., Single-BS MBS and Multi-BS MBS) |
| R6 multicast IP address | [R6 multicast IP address, MBS zone ID] mapping relationship |
| [R3 broadcast channel IP address, MBS zone ID & MCID] mapping relationship | |
| [R3 broadcast channel IP address, MBS zone ID] mapping relationship | |

A description will now be given of the dynamic path establishment method based on signaling.

The ASN_GS establishes a data path for a broadcasting service through signaling before the start of a broadcast.

Figure 2:
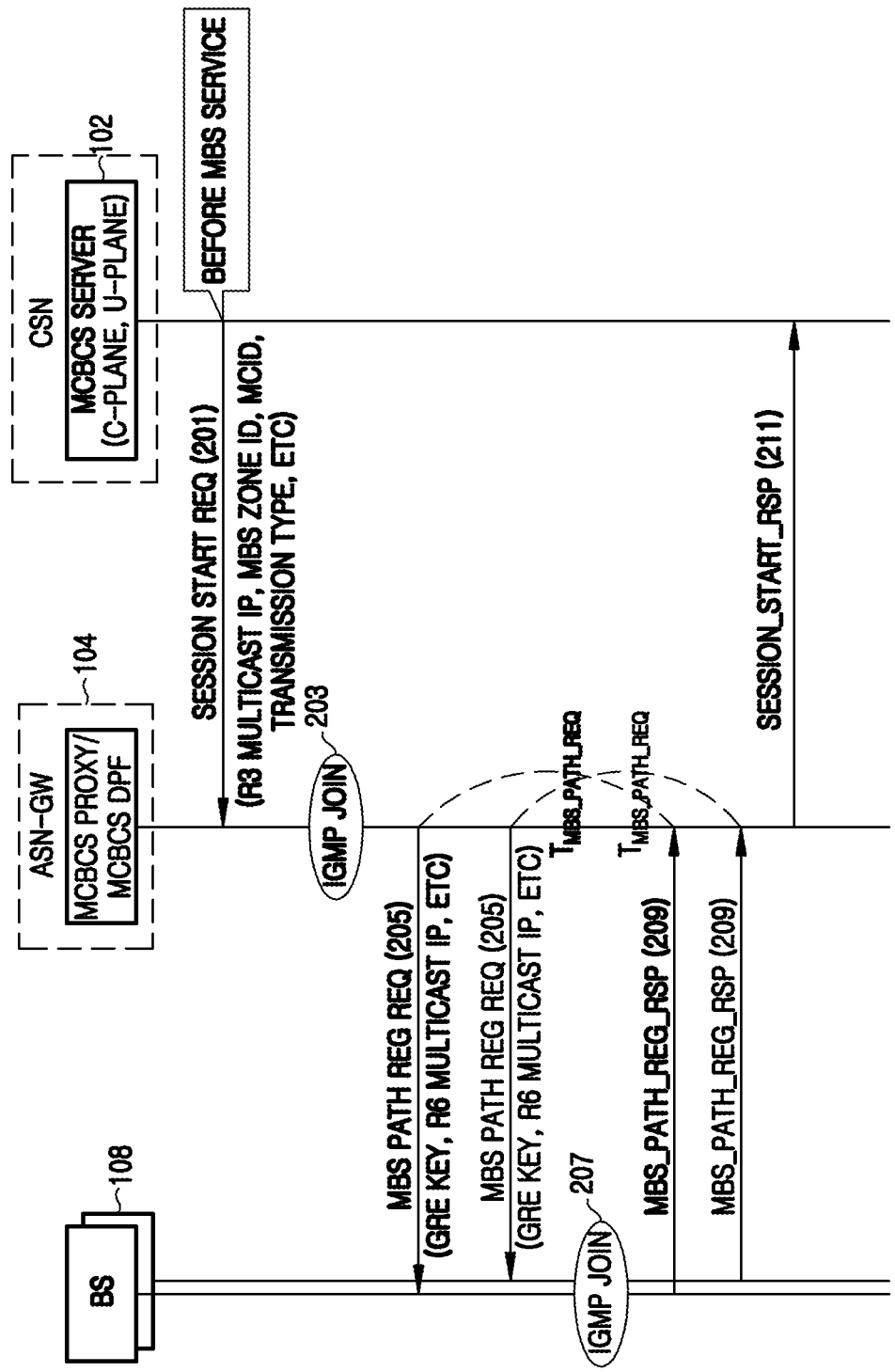
FIG. 2 is a flow diagram illustrating a process for creating a data path for a broadcasting service according to an exemplary embodiment of the present invention.

FIG. 2 is a flow diagram illustrating a process for creating a data path for a broadcasting service according to an exemplary embodiment of the present invention.

Referring to FIG. 2, in step 201, before a start of a broadcast (or in advance of MBS data delivery), the MCBCS server 102 sends an R3 session start request (Session_Start_Req) message to the ASN_GW 104 (MCBCS proxy or MBS proxy) in order to request a multicast connection setup. Herein, the R3 session start request message may include at least one of an MBS zone ID, an R3 multicast IP address, [R3 multicast IP address vs. MBS zone ID & MCID] mapping information, MCIDs corresponding to the MBS zone ID, a broadcast service start/end time (delivery start time & delivery end time), air scheduling information for each MBS zone, air scheduling information for each MCID, air scheduling information for an MBS MAP message, a network element address on which the ASN_GW is to perform an IGMP join & leave operation, a transmission type (dynamic multicast or static multicast; single-BS MBS or multi-BS MBS with macro diversity or multi-BS MBS without macro diversity), a source ID (an MCBCS server ID), and a destination ID (an ASN_GW ID).

In step 203, upon receipt of the R3 session start request message, the ASN_GW 104 sends an IGMP join message to a multicast router to establish a multicast connection based on the multicast IP address included in the R3 session start request message. If an MCBCS data transmission for an R3 interface is performed in a unicast mode, that is, if a communication is performed in an IP-in-IP mode (wherein an outer IP address is a unicast IP address for communication between the ASN_GW and the MCBCS server and an inner IP address is a multicast IP address for a broadcast), an IGMP join/leave operation may not be performed. That is, the ASN_GW 104 transmits an IGMP join message to a multicast router connected to the MCBCS server 102, to enable a receiving function for a specific multicast address. Herein, the IGMP join operation may be performed as many times as the number of R3 multicast IP addresses included in the R3 session start request message. That is, the IGMP join process may be performed on a broadcast channel-by-broadcast channel basis.

In step 205, after completion of the IGMP join operation, the ASN_GW 104 (MCBCS DPF or MBS DPF) transmits an R6 MBS path registration request (MBS_path_Reg_Req) message to BSs 108 in the corresponding MBS zone to request R6 data path establishment and reservation of air resources at the BSs. Herein, the R6 MBS path registration request message may include at least one of an MBS zone ID, an R6 multicast IP address, MCIDs corresponding to the MBS zone ID, an GRE key, a broadcast service start/end time (delivery start time & delivery end time), air scheduling information for each MBS zone, air scheduling information for each MCID, air scheduling information for an MBS MAP message, a network element address on which the BS is to perform an IGMP join & leave operation, a transmission type (dynamic multicast or static multicast; single-BS MBS or multi-BS MBS with macro diversity or multi-BS MBS without macro diversity), a source ID (an ASN_GW ID), and a destination ID (a BSID).

In step 207, upon receipt of the R6 MBS path registration request message, the BSs 108 send an IGMP join message to a multicast router to establish a multicast connection based on the information of the R6 MBS path registration request message. That is, the BSs 108 transmit an IGMP join message to a multicast router connected to the ASN_GW 104, to enable a receiving function for a specific multicast address. Herein, the IGMP join operation may be performed as many times as the number of R6 multicast IP addresses included in the R6 MBS path registration request message. That is, the IGMP join operation may be performed on a MBS zone-by-MBS zone basis.

In step 209, after the multicast connection setup, the BSs 108 send an R6 MBS path registration response (MBS_Path Reg Rsp) message to the ASN_GW 104 (MBS DPF) as a response to the R6 MBS path registration request message. Herein, the R6 MBS path registration response message may include an MBS zone ID, information about a success or failure of path establishment for each MBS zone ID (a success or failure report per MBS zone ID), detailed information about a path establishment failure (a detailed failure report per MBS zone ID (e.g., a failed MCID list)), a source ID (a BSID), and a destination ID (an ASN_GW ID).

In step 211, upon completion of the multicast connection establishment for the R3 interface, the ASN_GW 104 transmits an R3 session start response (Session_Start_Rsp) message to the MCBCS server 102. Herein, the R3 session start response message may include an MBS zone ID, information about a success or failure of path establishment for each MBS zone ID (a success or failure report per MBS zone ID), detailed information about a path establishment failure (a detailed failure report per MBS zone ID (e.g., a failed MCID list)), a source ID (an ASN_GW ID), and a destination ID (an MCBCS server ID). That is, a data path between the MCBCS server, the ASN_GW, and the BS may be established through the above process.

In the above exemplary embodiment, if the MCBCS server transmits an R3 session start request message including an broadcast channel application layer ID or a broadcast channel multicast IP address to an ASN_GW (an MBS proxy/primary MBS DPF), the ASN_GW may transmit an R3 session start response message, which explicitly or implicitly includes an [Upper layer vs. MAC layer] broadcast channel ID mapping relationship generated by the NAP or the ASN_GW, to the MCBCS server. Herein, the implicit method is a method that a MAC layer ID is included in a multicast IP address or an application layer ID (e.g., a content ID and a program ID).

As described above, if the IGMP join operation is performed, the information about the success or failure of the MBS path registration request or the session start request message can be indirectly determined through the IGMP. Therefore, a 2 way handshake (req/rsp) instead of a 3 way handshake (req/rsp/ack) may be sufficient for the signaling for each interface. If the signaling is performed using a unicast, the 2 way or the 3 way may be used.

The process of FIG. 2 may be performed if an MBS zone is newly generated or if a broadcast channel is added to an MBS zone.

Meanwhile, in the exemplary embodiment of FIG. 2, the session start response message may be transmitted to the MCBCS server 102 regardless of the results of the R6 MBS path registration response message. In this case, a data path establishment process is performed as illustrated in FIG. 7.

Figure 7:
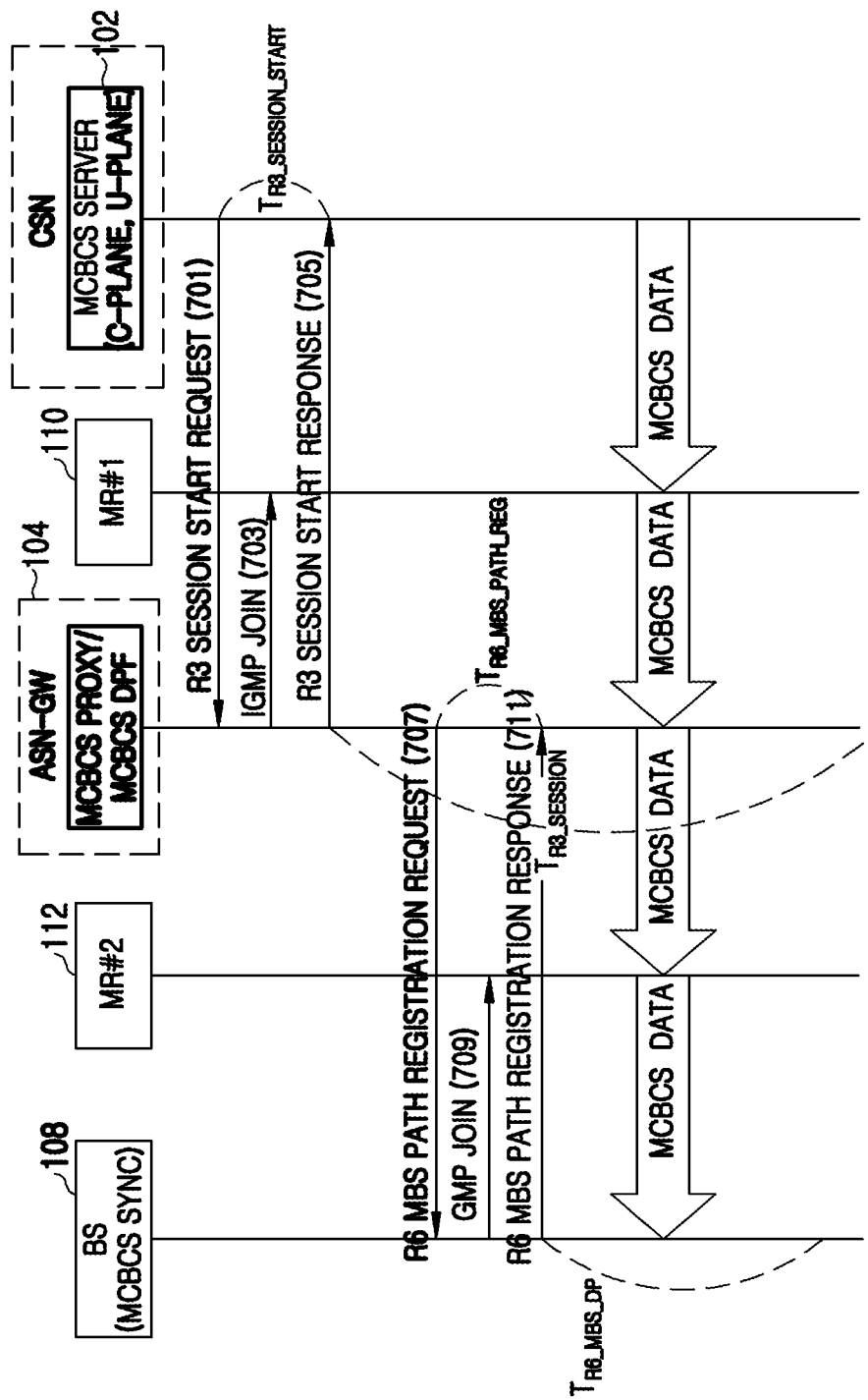
FIG. 7 is a flow diagram illustrating a process for creating a data path for a broadcasting service according to an exemplary embodiment of the present invention.

Referring to FIG. 7, in step 701, before transmission of MBS data (in advance of MBS data delivery), the MCBCS server 102 sends an R3 Session Start Request message to the ASN_GW 104 (or the MBS proxy/primary MBS DPF) in order to request a multicast connection setup. In step 703, upon receipt of the R3 Session Start Request message, the ASN_GW 104 (MBS DPF) sends an IGMP Join message to a Multicast Router (MR) to establish a multicast connection based on a multicast IP address included in the R3 Session Start Request message. That is, the ASN_GW 104 transmits an IGMP Join message to an MR#1 110 connected to the MCBCS server 102, to enable a receiving function for a specific multicast address.

In step 705, after establishing the multicast connection with the MCBCS server 102, the ASN_GW (MBS proxy) 104 responds to the MCBCS server 102 with an R3 Session Start Response message. Herein, the R3 Session Start Response message may include information about a success or failure of path establishment for each broadcast channel. Herein, the transmission orders of the R3 Session Start Response message and the IGMP Join message are interchangeable.

Thereafter, in step 707, the ASN_GW 104 transmits an R6 MBS Path Registration Request message to a BS 108 to request R6 data path establishment and reservation of an air resource at the BS 108. In addition, the ASN_GW 104 starts a $T_{R6\_MBS\_Path\_Reg}$ timer. In step 709, upon receipt of the R6 MBS Path Registration Request message, the BS 108 sends an IGMP Join message to an MR#2 112 to establish a multicast connection based on the information of the R6 MBS Path Registration Request message. In step 711, after completion of the IGMP join operation, the BS 108 sends an R6 MBS Path Registration Response message to the ASN_GW 104. Upon reception of R6_MBS_Path_Reg_Rsp message, the MBS DPF stops the $T_{R6\_MBS\_Path\_Reg}$ timer.

Figure 3:
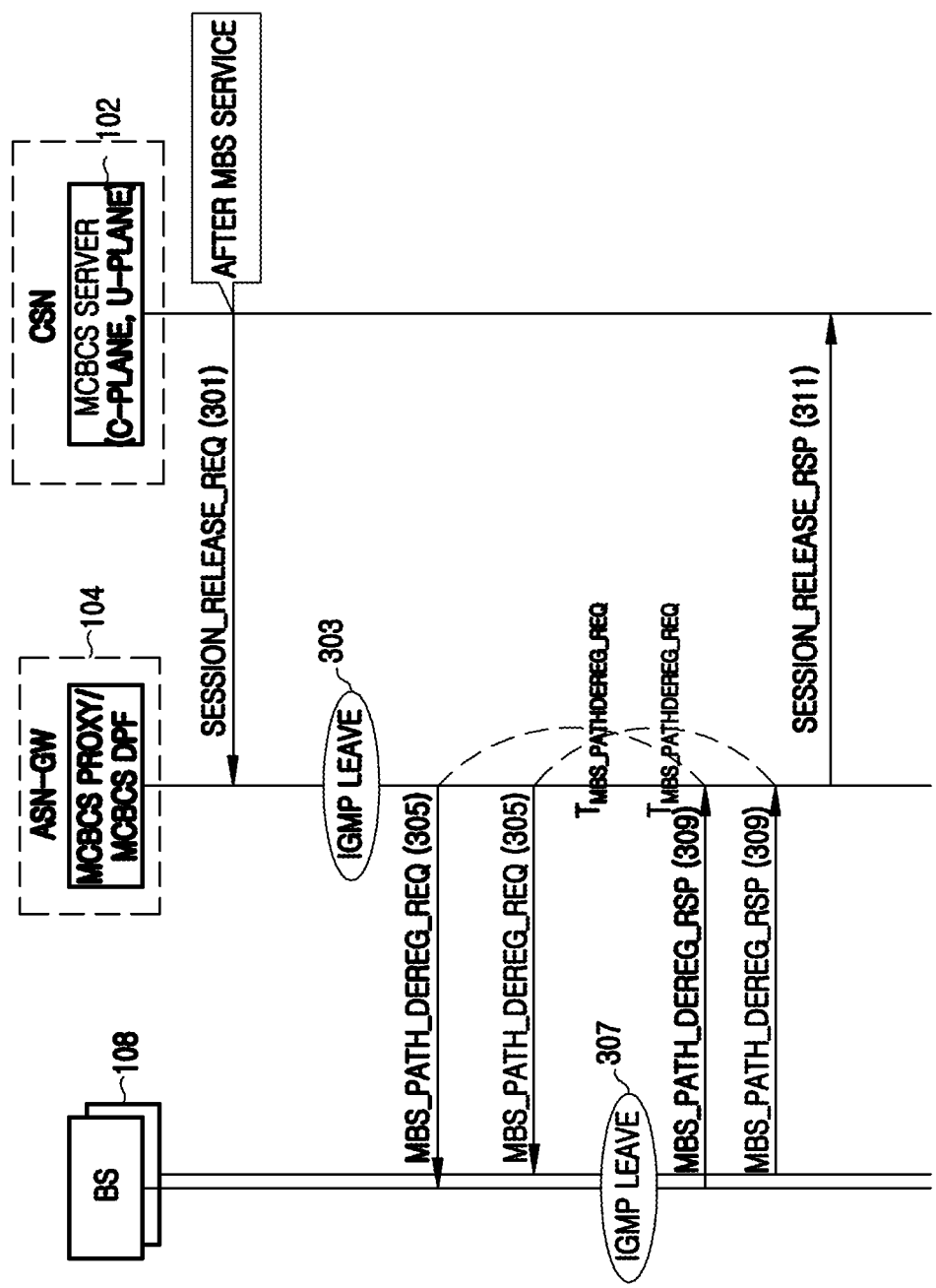
FIG. 3 is a flow diagram illustrating a process for releasing a data path for a broadcasting service according to an exemplary embodiment of the present invention.

FIG. 3 is a flow diagram illustrating a process for releasing a data path for a broadcasting service according to an exemplary embodiment of the present invention.

Referring to FIG. 3, in step 301, after an end of a broadcast (or when the MBS data delivery is completed), the MCBCS server 102 sends an R3 session release request (R3_Session_Release_Req) message to the ASN_GW (MBS Proxy) 104 in order to request a multicast connection release. Herein, the R3 session release request message may include at least one of an MBS zone ID, a release of MCIDs corresponding to the MBS zone ID, and a multicast IP address.

In step 303, upon receipt of the R3 session release request message, the ASN_GW (MBS DPF) 104 sends an IGMP leave message to a multicast router to release a multicast connection based on the information included in the R3 session release request message.

In step 305, after completion of the IGMP leave operation, the ASN_GW 104 transmits an R6 MBS path deregistration request (MBS_path_DeReg_Req) message to BSs 108 in the corresponding MBS zone to request R6 data path release and release air resources at the BSs 108. Herein, the R6 MBS path deregistration request message may include at least one of a BSID, an MBS zone ID, an GRE key, a release of MCIDs corresponding to the MBS zone, and a multicast IP address.

In step 307, upon receipt of the R6 MBS path deregistration request message, the BSs 108 send an IGMP leave message to an MR connected to the ASN_GW 104, to release a multicast connection based on the information of the R6 MBS path deregistration request message. In step 309, after the multicast connection release, the BSs 108 send an R6 MBS path deregistration response (R6_MBS_Path_DeReg_Rsp) message to the ASN_GW 104 as a response of the R6 MBS path deregistration request message.

In step 311, upon release of the multicast connection with the MCBCS server 102, the ASN_GW 104 transmits an R3 session release response (Session_Release_Rsp) message to the MCBCS server 102. That is, a data path between the MCBCS server, the ASN_GW, and the BS is released through the above process.

The process of FIG. 3 may be performed if an MBS zone is deleted or if some channels in an MBS zone are deleted.

In FIGS. 2 and 3, because the R6 multicast IP addresses have a 1:1 relationship with the MBS zone IDs, the BS may perform the IGMP join/leave transaction as many times as the number of the MBS zones.

When the signaling for the data path establishment/release is performed, if bearer traffic transmitted through the corresponding interface (R3 or R6) is multicast traffic, an IGMP join/leave operation is performed as described above. However, if the bearer traffic is unicast traffic, the above IGMP process may not be performed. The IP addresses of bearer traffic have a 1:1 or 1:n relationship with broadcast channels on the R3 interface, and have a 1:1 relationship with MBS zones on the R6 interface. The number of IGMP join/leave messages is proportional to the number of multicast IP addresses. For the R6 interface according to an exemplary embodiment of the present invention, the multicast IP addresses are allocated on an MBS zone basis. Thus, the signaling overhead of a backhaul can be reduced considerably.

Meanwhile, in the exemplary embodiment of FIG. 3, the session release response message may be transmitted to the MCBCS server 102 regardless of the results of the R6 MBS path deregistration response message. In this case, a data path release process is performed as illustrated in FIG. 8.

Figure 8:
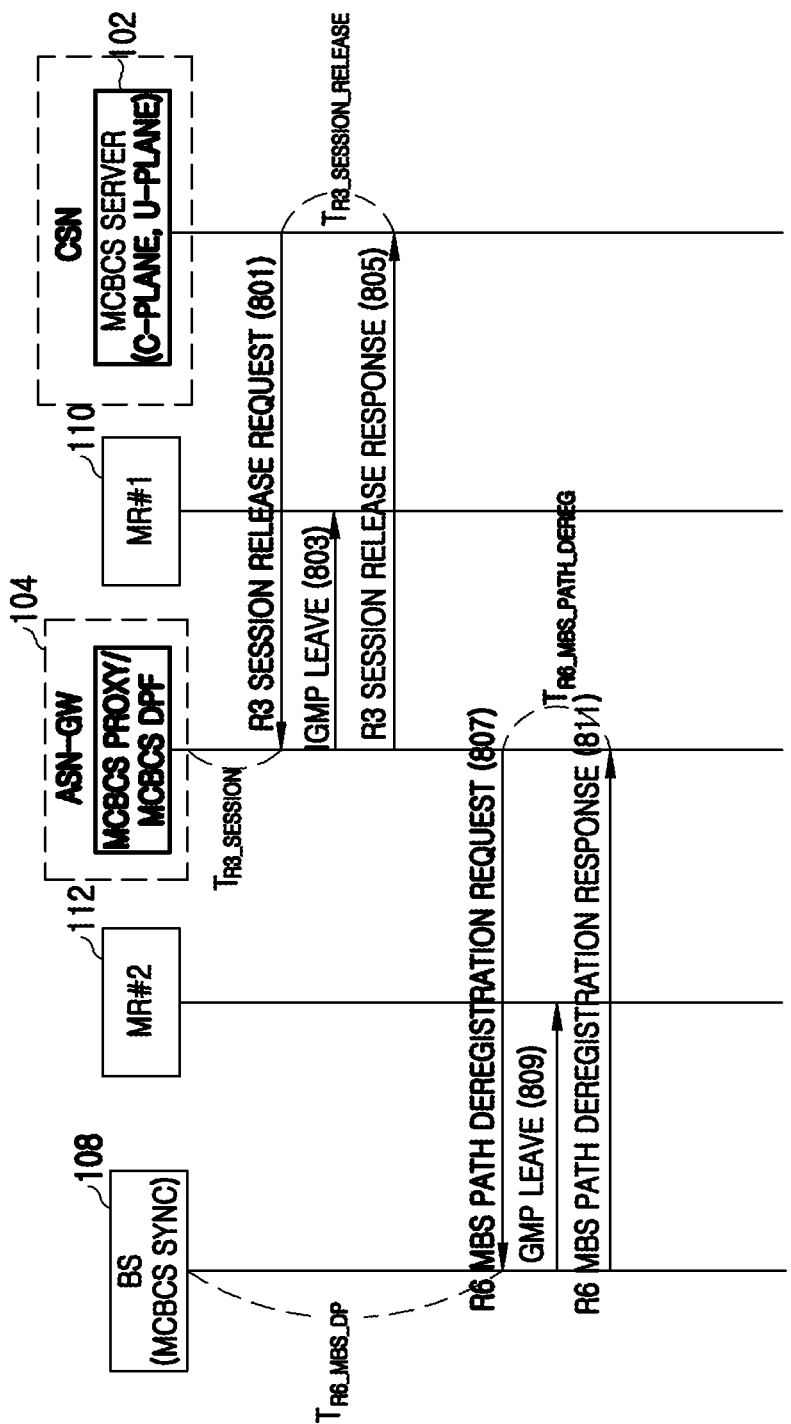
FIG. 8 is a flow diagram illustrating a process for releasing a data path for a broadcasting service according to an exemplary embodiment of the present invention.

Referring to FIG. 8, in step 801, when the MBS data delivery is completed, the MCBCS server 102 sends an R3 Session Release Request message to the ASN_GW 104 (or the MBS proxy/primary MBS DPF) in order to request a multicast connection release. In step 803, upon receipt of the R3 Session Release Request message, the ASN_GW 104 sends an IGMP Leave message to MR#1 110, connected to the MCBCS server 102, to release the multicast connection based on the information included in the R3 Session Release Request message.

In step 805, after releasing the multicast connection with the MCBCS server 102, the ASN_GW 104 responds to the MCBCS server 102 with an R3 Session Release Response message. Herein, the R3 Session Release Response message may include information about a success or failure of a path release for each broadcast channel. Herein, the transmission orders of the R3 Session Release Response message and the IGMP Leave message are interchangeable. The subsequent steps 807, 809 and 811 are similar to steps 305, 307 and 309 of FIG. 3, and thus their detailed description will be omitted for conciseness.

Figure 4:
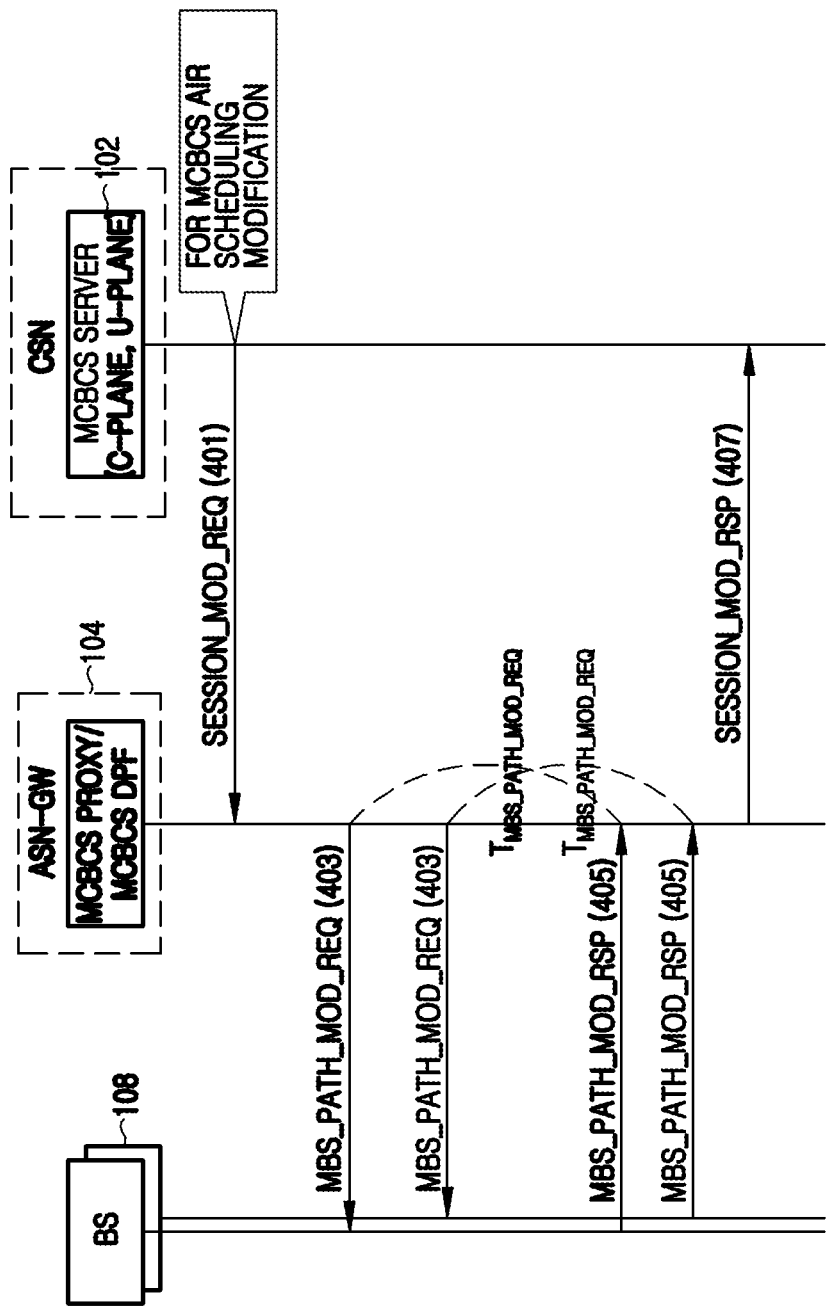
FIG. 4 is a flow diagram illustrating a process for modifying a data path for a broadcasting service according to an exemplary embodiment of the present invention.

FIG. 4 is a flow diagram illustrating a process for modifying a data path for a broadcasting service according to an exemplary embodiment of the present invention.

Referring to FIG. 4, if a parameter of a specific broadcast channel is to be changed, the MCBCS server 102 transmits a session modification request (Session_Mod_Req) message to the ASN_GW 104 in step 401. Herein, the session modification request message may include at least one of an MBS zone ID, an MCID of a broadcast channel to be changed, and changed parameter information (e.g., air scheduling information).

In step 403, upon receipt of the session modification request message, the ASN_GW 104 changes parameter information of a corresponding broadcast channel and transmits an MBS path modification request (MBS_path_Mod_Req) message to BSs 108 in an MBS zone serving the broadcast channel. Herein, the MBS path modification request message may include at least one of a BSID, an MBS zone ID, MCIDs of broadcast channels to be changed, and changed parameter information (e.g., air scheduling information).

In step 405, upon receipt of the MBS path modification request message, the BSs 108 change parameter information of a corresponding MBS zone and transmit an MBS path modification response (MBS_Path_Mod_Rsp) message in response to the MBS path modification request message. Herein, the MBS path modification response message may include at least one of a BSID, an MBS zone ID, MCIDs, information about a success or failure of a parameter change for each broadcast channel, and detailed information about a parameter change failure.

In step 407, upon receipt of the MBS path modification response message from the corresponding BSs, the ASN_GW 104 transmits a session modification response (Session_Mod_Rsp) message to the MCBCS server 102. Herein, the session modification response message may include at least one of an MBS zone ID, corresponding MCIDs, information about a success or failure of parameter change for each broadcast channel, and detailed information about a parameter change failure.

The process of FIG. 4 may be performed if parameter information (e.g. air scheduling information) of a set-up broadcast channel is changed. Meanwhile, the functions of the session modification request message and the session modification response message may be replaced by a session start request message and a session start response message.

Meanwhile, the ASN_GW 104 may transmit the session modification response message to the MCBCS server 102 regardless of the results of an R6 response message (i.e., the MBS path modification response message). In this case, a data path modification process is performed as illustrated in FIG. 9.

Figure 9:
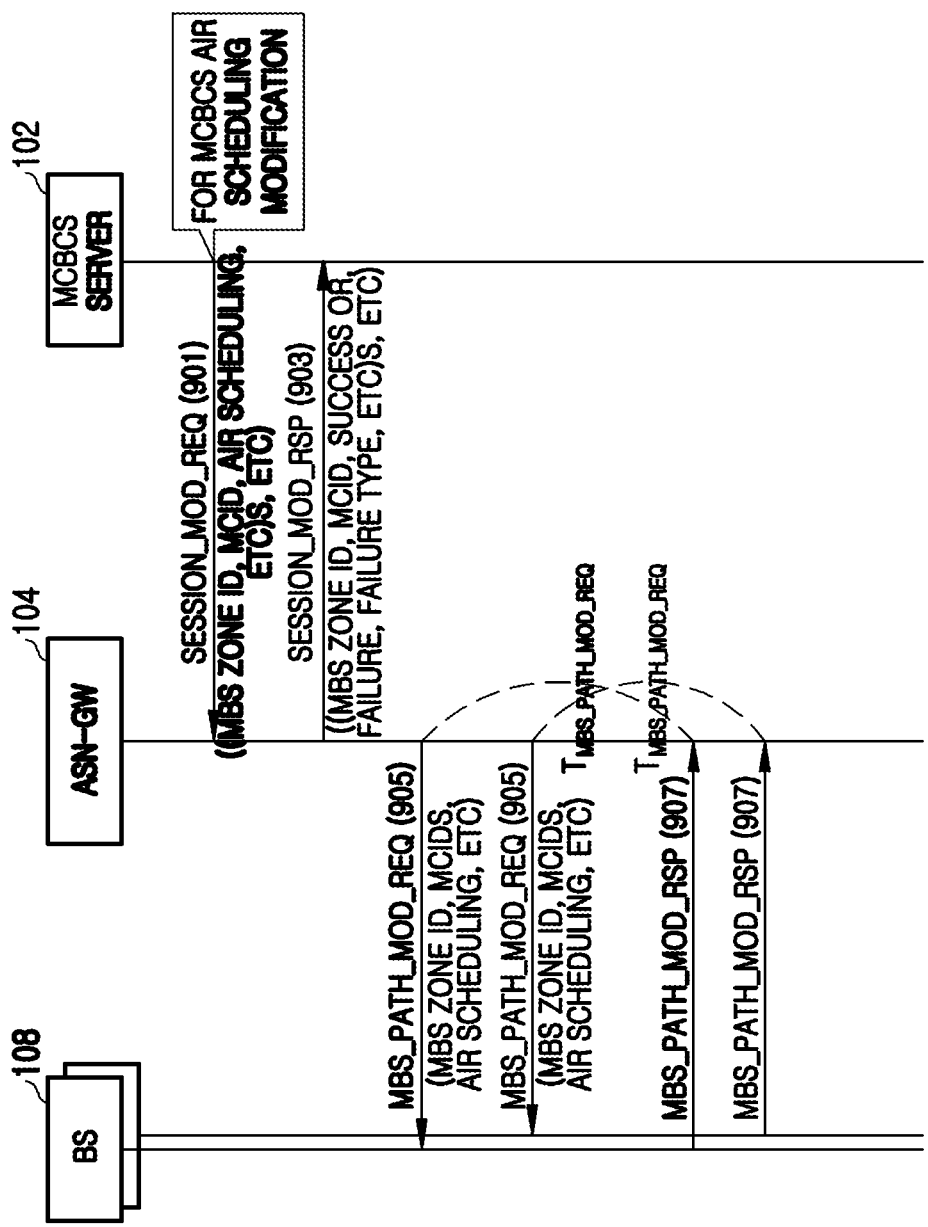
FIG. 9 is a flow diagram illustrating a process for modifying a data path for a broadcasting service according to an exemplary embodiment of the present invention.

Referring to FIG. 9, upon receipt of a session modification request (Session_Mod_Req) message from the MCBCS server 102 in step 901, the ASN_GW 104 changes parameter information of a corresponding broadcast channel and transmits a session modification response (Session_Mod_Rsp) message to the MCBCS server 102, in step 903. Herein, the session modification response message may include information about a success or failure of path modification for each broadcast channel. The subsequent steps 905 and 907 are similar to steps 403 and 405 of FIG. 4, and thus their detailed description will be omitted for conciseness.

Hereinafter, a functional unit in the ASN_GW for performing the above session start/session release/session modification will be referred to as an MBS proxy, and a functional unit for performing the IGMP join/leave and the MBS path registration/deregistration will be referred to as an MBS DPF. Herein, an MBS proxy and a primary MBS DPF are collocated (that is, are present in the same ASN_GW) and may be present in each MBS zone.

The MBS DPF may be divided into a primary MBS DPF and a serving MBS DPF. The primary MBS DPF performs an IGMP join/leave with respect to the MCBCS server, and transmits an MBS path registration/deregistration (MBS_Path_Reg/Dereg) message to BSs that belong to the corresponding MBS zone in the ASN managed by the primary MBS DPF. If different ASNs belong to the same MBS zone, the primary MBS DPF may transmit the MBS_Path_Reg/Dereg message through an R4 interface (the primary MBS PDF→the serving MBS PDF of another ASN)

In addition, the primary MBS PDF performs packetization and time stamping for synchronization. If a plurality of ASNs are present in an MBS zone, the primary MBS DPF relays a synchronized packet to a serving MBS DPF of another ASN and the serving MBS DPF relays the packetized packet to BSs in the MBS zone managed by the serving MBS DPF.

In FIGS. 2 to 4 and 7 to 9, it is assumed that the minimum unit of the content included in messages according to exemplary embodiments of the present invention is a broadcast channel. In addition, it is assumed that the broadcast channels broadcasted in the same time zone in one MBS zone are included in one message. Also, it is assumed that the messages according to exemplary embodiments of the present invention may include set information about at least one MBS zone.

In addition, for the multi-BS MBS, it is assumed that if any one of the broadcast channels broadcasted in the same time zone for one MBS zone for one subcell fails in data path establishment, the subcell does not provide a service for the MBS zone. However, even if path establishment for some broadcast channels fail according to the policy of a service provider, a service can be provided for the corresponding MBS zone.

Herein, it is assumed that an IP address of a signaling message is an IP address of a receiving NE. Thus, an IP address of an R6 signaling message may be an IP address of a BS. In this case, the signaling message may include an ID of a subcell (e.g., a BSID) together with an MBS zone ID in order to determine to which subcell the MBS zone ID belongs.

Meanwhile, if an emergency/disaster broadcast is to be used, the data path between the MCBCS server, the ASN and the BS as illustrated in FIG. 2 is created. For elimination of such a signaling delay, at least one of an MCID, an MBS zone ID, an R3/R6 multicast IP address, and a GRE key for the emergency broadcast may be configured in advance.

In addition, an exemplary embodiment of the present invention provides an emergency broadcast to a user terminal of a sleep state or an idle state, and it is assumed that an MBS_MAP_IE is transmitted to a user terminal of a sleep state during a listening window period and is transmitted to a user terminal of an idle state during a Paging Listening Interval (PLI) period. A single-BS MBS, and not a multi-BS MBS, may be used for the current emergency broadcast. For single-BS MBS, the MBS_MAP_IE may include at least one of a 16-bit CID, the position and size of a data burst including emergency broadcast information, and air scheduling information. According to the conventional communications standards, a user terminal reads only a CID and thus cannot identify an emergency broadcast. An exemplary embodiment of present invention proposes to statically allocate a specific CID for an emergency broadcast. Although both of an MCID and a Transport CID (TCID) can be used, because the TCID is used for unicast traffic, it is preferable that a specific MIID is fixed as an emergency broadcast CID.

The IDs used in an exemplary embodiment of the present invention are as follows.

The content ID denotes a broadcast channel ID of an application layer, the MBS zone ID denotes an ID of a broadcast service zone, and an MCID denotes a broadcast channel ID of a MAC layer unique in an MBS zone. A scheme for managing an MBS zone ID, an MCID, and an R6 multicast address at an ASN is illustrated in Table 3 below.

TABLE 3

| Items | Functions |
|---|---|
| Maximum Control Number | Control up to 127 MBS zones for each ASN_GW ('0' is used to indicate a BS not supporting an MBS) ASN_GW:MBS zone ID = 1:n |
| Information Acquisition & Information Management | Acquire the following information from an ASN_GW OMC or an MCBCS server An NE (multicast router or MCBCS server) address on which an ASN_GW is to perform an IGMP join/leave operation<br>R3 broadcast channel IP:MCID = 1:n<br>R3 broadcast channel IP:Content ID = 1:1 (or 1:n)<br>MBS zone ID:BSID = n:m<br>MBS zone ID:MCID = 1:n-broadcast service stat/end time<br>Air scheduling information for each MBS zone<br>Air scheduling information for each MCID<br>Air scheduling information for MBS MAP message<br>(Air scheduling information: Permutation, MCS level, Transmission period, Stat/end time, and the position and size of an MBS zone)<br>GRE key:(MBS zone ID, MCID) = 1:1<br>(Can support a plurality of MBS zones in one subcell)<br>MBS zone ID:R6 multicast IP address = 1:1<br>R6 multicast IP address:MCID = 1:n<br>If a plurality of ASN_GWs are included in one MBS zone, signaling-based BS control is managed by each ASN_GW. However, for bearer traffic, all the BSs associated with an MBS zone receive traffic from one ASN_GW (master ASN_GW or anchor ASN_GW) connected to an MR. That is, BSs perform an IGMP join & leave operation for an R6 multicast IP address by the MR. An MCBCS server determines which ANS_GW is to be a master, and performs configuration accordingly. |

If a plurality of ASN_GWs are included in one MBS zone, signaling-based BS control is managed by each ASN_GW. However, for bearer traffic, all the BSs associated with an MBS zone receive traffic from one ASN_GW (master ASN_GW or anchor ASN_GW) connected to a multicast router. That is, BSs perform an IGMP join & leave operation for an R6 multicast IP address by a multicast router. An MCBCS server determines which ANS_GW is to be a master, and performs configuration accordingly.

As illustrated in Table 3, a plurality of subcells (BSIDs) may be included in one MBS zone ID. Also, a plurality of MBS zones may be supported in one subcell. Because an MBS zone ID and an MCID is preset according to a broadcast schedule, an integrate OMC allocates an R6 multicast IP address to each MBS zone ID to transmit the same to an ASN_GW.

Hereinafter, a description will be given of an overall data communication process based on the above descriptions.

Figure 5:
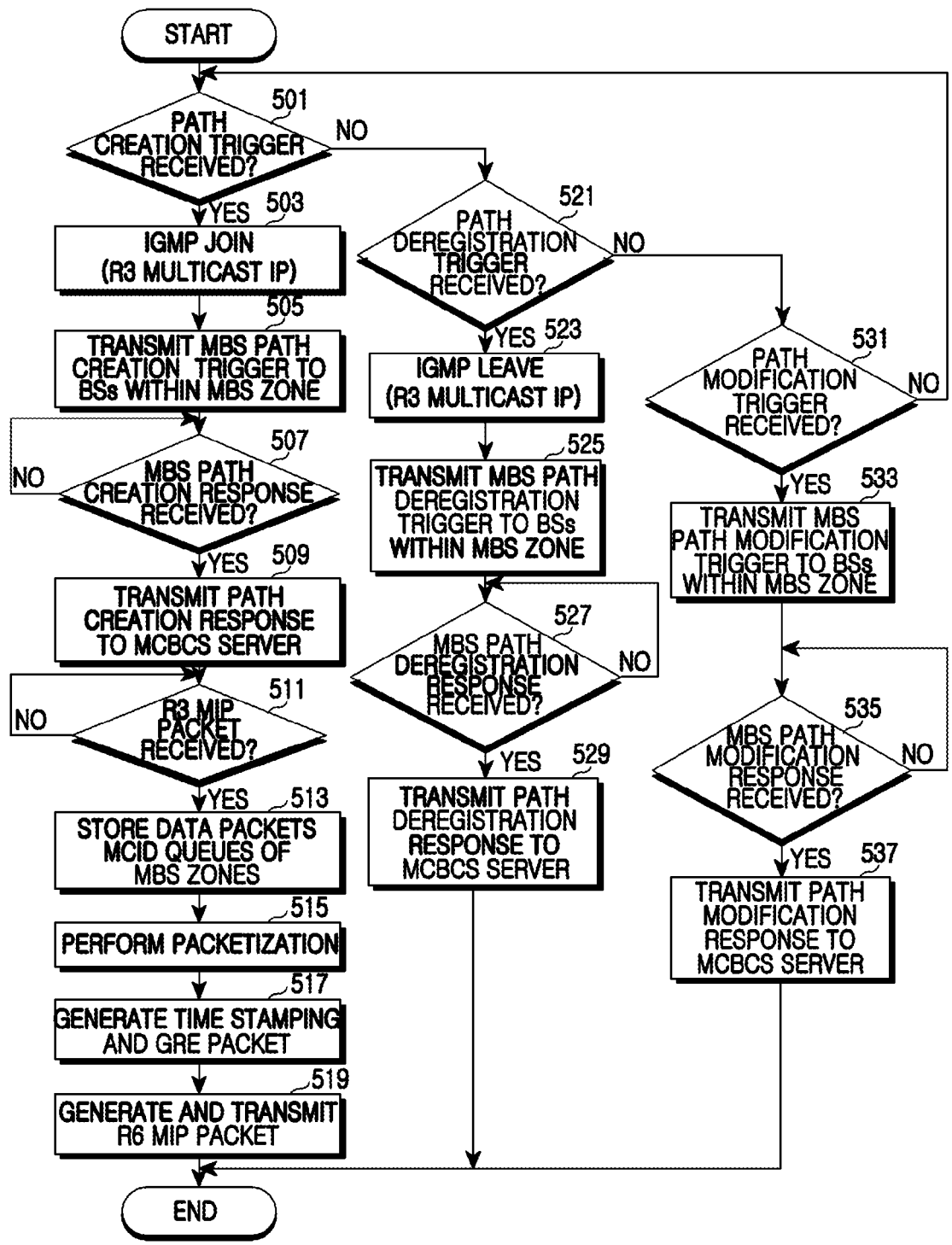
FIG. 5 is a flowchart illustrating an operational process of an Access Service Network-GateWay (ASN_GW) according to an exemplary embodiment of the present invention.

FIG. 5 is a flowchart illustrating an operational process of the ASN_GW according to an exemplary embodiment of the present invention.

Referring to FIG. 5, in step 501, the ASN_GW 104 determines whether a trigger indicating data path creation for a broadcast channel is received from the MCBCS server 102. Herein, the data path creation trigger may be the above-described session start request message. If the session start request message is received, the ASN_GW 104 stores information extracted from the session start request message, in step 503. The stored information may be used for the subsequent signaling or traffic transmission. In addition, using the extracted information, the ASN_GW 104 performs an IGMP join operation on a multicast router connected to the MCBCS server 102, to enable a receiving function of a specific multicast address. In another exemplary embodiment, the ASN_GW 104 may perform an IGMP join operation at a suitable time before the start of a broadcast according to a broadcast schedule.

After completion of the IGMP join operation, the ASN_GW 104 transmits an MBS path creation trigger to BSs 108 within an MBS zone, in step 505. Herein, the MBS path creation trigger may be the above-described MBS path registration request (MBS_Path_Reg_Req) message.

Upon receipt of the MBS path registration request message, the BSs 108 store information extracted from the MBS path registration request message. The stored information may be used for the subsequent signaling and traffic transmission. Using the extracted information, the BSs 108 perform an IGMP join operation on a multicast router connected to the ASN_GW 104, to enable a receiving function of a specific multicast address, and transmit a response to the MBS path registration request message to the ASN_GW 104. Herein, the response to the MBS path registration request message may be the above-described MBS path registration response (MBS_Path_Reg_Rsp) message. In another exemplary embodiment, the BS 108 may perform an IGMP join operation at a suitable time before the start of a broadcast according to a broadcast schedule.

Thus, after transmission of the MBS path registration request message, the ASN_GW 104 determines in step 507 whether a response to an MBS path registration request message (i.e., an MBS path registration response) is received from BSs 108 associated with an MBS zone. If the response is received from the BSs 108, the ASN_GW 104 transmits a response to data path creation (i.e., a session start response) to the MCBCS server 102 in step 509. In another exemplary embodiment, the response message for the data path creation (i.e., the session start response message) may be transmitted directly to the MCBCS server 102 after performance of the IGMP join operation in step 503, regardless of the results of an R6 response message. After creation of the data path for a broadcast service, the ASN_GW 104 determines in step 511 whether an R3 broadcast channel IP (R3 MIP) packet is received from the MCBCS server 102. If an R3 broadcast data packet starts to be received according to the start of a broadcast, the ASN_GW 104 stores the received R3 broadcast data packets in an MCID queue of MBS zones, in step 513.

In step 515, the ASN_GW 104 packetizes the stored packets in consideration of a burst size of a wireless section. That is, in accordance with a burst size of a wireless section, the IP packets stored in the MCID queue are fragmented and packed to generate an MAC Service Data Unit (SDU).

In step 517, the ASN_GW 104 time-stamps a broadcast absolute time with respect to each MAC SDU generated through the packetization, and prefixes a GRE header to the MAC SDU to generate a tunneling packet (GRE packet). Herein, broadcast-related information such as an MBS zone ID and an MCID is recorded in the GRE header.

In step 519, the ASN_GW 104 prefixes an R6 multicast IP header to the tunneling packet to generate an IP packet, physical-layer-encodes the IP packet, and transmits the results to BSs within an MBS zone. The steps 511 to 519 continue to be performed unless the data path for the MBS zone is released. In addition, if a plurality of ASN_GWs are present in one MBS zone, one of the ASN_GWs is designated as an anchor ASN_GW and the anchor ASN_GW may perform the data and time synchronization.

Meanwhile, in step 521, the ASN_GW 104 determines whether a trigger indicating data path deregistration for a broadcast zone (or a broadcast channel) is received from the MCBCS server 102. Herein, the data path deregistration trigger may be the above-described session release request message. If the session release request message is received, the ASN_GW 104 transmits an IGMP leave message to a multicast router connected to the MCBCS server 102 to deregister a data path between the MCBCS server 102 and the ASN_GW 104, in step 523. In another exemplary embodiment, the ASN_GW 104 may perform an IGMP leave operation at a suitable time after the end of a broadcast according to a broadcast schedule.

After completion of the IGMP leave operation, the ASN_GW 104 transmits an MBS path deregistration trigger to BSs 108 within an MBS zone, in step 525. Herein, the MBS path deregistration trigger may be the above-described MBS path deregistration request (MBS_Path_DeReg_Req) message. Upon receipt of the MBS path deregistration request message, the BSs 108 transmit an IGMP leave message to a multicast router connected to the ASN_GW, to deregister a data path between the ASN_GW 104 and the BS 108, and transmit a response to the MBS path deregistration request message (i.e., an MBS path deregistration response) to the ASN_GW 104.

Thus, in step 527, the ASN_GW 104 determines whether the MBS path deregistration response is received from BSs 108. If the MBS path deregistration response message is received from BSs within an MBS zone, the ASN_GW 104 transmits a response to data path deregistration (i.e., a session release response) to the MCBCS server 102 in step 529. In another exemplary embodiment, the response message for the data path deregistration (i.e., the session deregistration response message) may be transmitted directly to the MCBCS server 102 after performance of the IGMP leave operation in step 523, regardless of the results of the R6 response message.

Meanwhile, in step 531, the ASN_GW 104 determines whether a trigger indicating data path modification for a broadcast channel is received from the MCBCS server 102. Herein, the data path modification trigger may be the above-described session modification request message. If the session modification request message is not received, the process returns to step 501.

If the session modification request message is received, the ASN_GW 104 changes parameter information of the broadcast channel and transmits an MBS path modification trigger to BSs of an MBS zone serving the broadcast channel, in step 533. Herein, the MBS path modification trigger may be the above-described MBS path modification request (MBS_path_Mod_Req) message.

Upon receipt of the MBS path modification request message, the BSs 108 change parameter information of the broadcast channel and transmits an MBS path modification response (MBS_Path_Mod_Rsp) message to the ASN_GW 104 in response to the MBS path modification request message.

Thus, in step 535, the ASN_GW 104 determines whether the MBS path modification response message is received from BSs 108. If the MBS path modification response message is received, the ASN_GW 104 transmits a session modification response message to the MCBCS server 102 in step 537. In another exemplary embodiment, the session modification response message may be transmitted to the MCBCS server 102, regardless of the results of the R6 response message.

Figure 6:
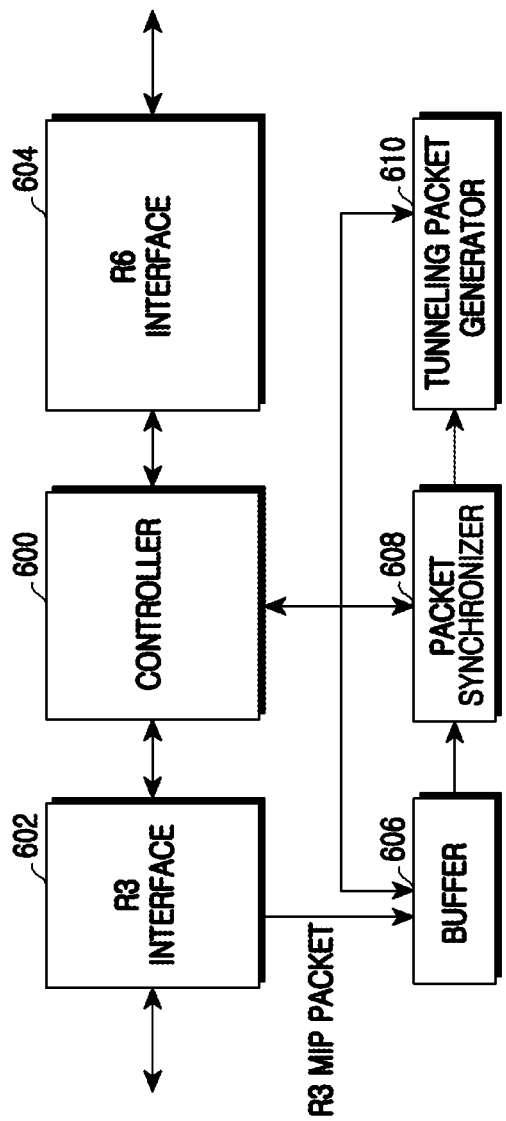
FIG. 6 is a block diagram of an ASN_GW according to an exemplary embodiment of the present invention.

FIG. 6 is a block diagram of an ASN_GW according to an exemplary embodiment of the present invention.

Referring to FIG. 6, the ASN_GW 104 includes a controller 600, an R3 interface 602, an R6 interface 604, a buffer 606, a packet synchronizer 608, and tunneling packet generator 610.

The controller 600 controls overall operations of the ASN_GW 104. For example, the controller 600 manages various information for a broadcast service as shown in Table 2, and provides a broadcast service based on the information as shown in Table 2.

The R3 interface 602 analyzes an IP packet received from the MCBCS server 102 and generates a transmission IP packet to transmit the same to the MCBCS server 102. Herein, if the received packet is determined to be signaling, the R3 interface 602 extracts signaling information from the received packet and provides the same to the controller 600. Also, under the control of the controller 600, the R3 interface 602 generates a packet including the signaling information and transmits the same to the MCBCS server 102.

The R6 interface 604 analyzes an IP packet received from a BS 108, generates a transmission IP packet, and transmits the same to the BS 108. Herein, if the received packet is determined to be a signaling message, the R6 interface 604 extracts signaling information from the received packet and provides the same to the controller 600. In addition, under the control of the controller 600, the R6 interface 604 generates a packet including the signaling information and transmits the same to the BS 108.

According to an exemplary embodiment of the present invention, if a session start request message is received from the MCBCS server 102, the controller 600 controls the R3 interface 602 to perform an IGMP join operation on the MCBCS server 102. After performance of the IGMP join operation, the controller 600 controls the R6 interface 604 to transmit an MBS path registration request (MBS_Path_Reg_Req) message to BSs associated with an MBS zone. If an MBS path registration response message is received from the BSs after transmission of the MBS path registration request message, the controller 600 controls the R3 interface 602 to transmit a session start response message to the MCBCS server 102. In another exemplary embodiment, the session start response message may be transmitted to the MCBCS server 102, regardless of the results of the R6 response message.

After creation of the data path for a broadcast service, the R3 interface 602 classifies received packets by R3 broadcast channel IP addresses and provides the classified packets to the buffer 606. The buffer 606 stores the R3 broadcast packets from the R3 interface 602 in an MCID queue of MBS zones, and outputs the corresponding packet under the control of the controller 600.

The packet synchronizer 608 fragments and packs the packets from the buffer 606 in accordance with a burst size of a wireless section to generate an MAC SDU. The tunneling packet generator 610 time-stamps a broadcast absolute time with respect to each MAC SDU from the packet synchronizer 608, and prefixes a GRE header to the MAC SDU to generate a tunneling packet (GRE packet). Herein, broadcast-related information such as an MBS zone ID and an MCID may be recorded in the GRE header.

The R6 interface 604 prefixes an R6 multicast IP header to the GRE packet to generate an IP packet, physical-layer-encodes the IP packet for actual transmission, and multicasts the results to BSs within the MBS zone.

In addition, according to an exemplary embodiment of the present invention, if a session release request message is received from the MCBCS server 102, the controller 600 controls the R3 interface 602 to perform an IGMP leave operation with respect to the MCBCS server 102. After performance of the IGMP leave operation, the controller 600 controls the R6 interface 604 to transmit an MBS path deregistration request (MBS_Path_DeReg_Req) message to BSs associated with the MBS zone. If an MBS path deregistration response message is received from the BSs after transmission of the MBS path deregistration request message, the controller 600 controls the R3 interface 602 to transmit a session release response message to the MCBCS server 102. In this way, the data path is released. In another exemplary embodiment, the session release response message may be transmitted to the MCBCS server 102, regardless of the results of the R6 response message.

In addition, according to an exemplary embodiment of the present invention, if a session modification request message is received from the MCBCS server 102, the controller 600 changes parameter information (e.g., air scheduling information) of a broadcast channel. Thereafter, the controller 600 controls the R6 interface 604 to transmit an MBS path modification request (MBS_Path_Mod_Req) message to BSs associated with the MBS zone serving the broadcast channel. If an MBS path modification response message is received from the BSs after transmission of the MBS path modification request message, the controller 600 controls the R3 interface 602 to transmit a session modification response (Session_Mod_Rsp) message to the MCBCS server 102. In this way, the parameters of the broadcast channel are changed. In another exemplary embodiment, the session modification response message may be transmitted to the MCBCS server 102, regardless of the results of the R6 response message.

As described above, exemplary embodiments of the present invention can efficiently perform creation, release and modification of a path between NEs for a wireless broadcasting service emerging as a main service in the cellular network. The exemplary embodiments of the present invention secure a data path for the R3 and R6 interfaces before transmission of contents, thus making it possible to transmit the contents without delay at the start of a broadcast. Also, the exemplary embodiments of the present invention perform the data path creation on an MBS zone (broadcast zone) basis, thus making it possible to considerably reduce the signaling overhead.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a broadcasting service in a cellular network, the method comprising:

transmitting a session start request message from a broadcast server to an Access Service Network-GateWay (ASN_GW) before delivery of Multicast and Broadcast Service (MBS) data, to request a multicast connection setup;

establishing, by the ASN_GW, a multicast connection between the broadcast server and the ASN_GW based on the information of the session start request message;

transmitting a path registration request message from the ASN_GW to at least one base station associated with a broadcast zone, to request MBS data path establishment and air resource reservation;

establishing, by the base station, a multicast connection between the ASN_GW and the base station based on the information of the path registration request message;

transmitting a path registration response message from the base station to the ASN_GW in response to the path registration request message, after establishment of the multicast connection between the ASN_GW and the base station;

transmitting a session start response message from the ASN_GW to the broadcast server in response to the session start request message;

one of multicasting and unicasting a broadcast packet from the broadcast server to the ASN_GW by use of an R3 broadcast channel Internet Protocol (IP) address at the start of MBS data delivery;

packetizing, by the ASN_GW, a received broadcast packet in accordance with a burst size of a wireless section to generate a Media Access Control (MAC) Service Data Unit (SDU);

time-stamping, by the ASN_GW, a broadcast absolute time with respect to the MAC SDU;

prefixing, by the ASN_GW, a GRE header to the MAC SDU to generate a tunneling packet;

prefixing, by the ASN_GW, an R6 multicast IP header to the tunneling packet to generate an IP packet; and multicasting, by the ASN_GW, the IP packet to base stations associated with the broadcast zone, wherein the session start response message includes information about a success or failure of path establishment for the base station.

2. The method of claim 1, wherein the ASN_GW establishes the multicast connection between the broadcast server and the ASN_GW through an Internet Group Management Protocol (IGMP) join operation, and the base station establishes the multicast connection between the ASN_GW and the base station through an IGMP join operation.

3. The method of claim 1, wherein the data path establishment between the broadcast server and the ASN_GW is performed on a content-by-content basis, and the data path establishment between the ASN_GW and the base station is performed on a broadcast zone-by-broadcast zone basis.

4. The method of claim 1, wherein the session start request message includes at least one of an MBS zone IDentifier (ID), an R3 multicast Internet Protocol (IP) address, [R3 broadcast channel IP vs. MBS zone ID and Multicast Connection ID (MCID)] mapping information, MCIDs corresponding to the MBS zone ID, a broadcast service start/end time, air scheduling information for each MBS zone, air scheduling information for each MCID, air scheduling information for an MBS MAP message, a network element address on which an ASN_GW is to perform an IGMP join and leave operation, a transmission type, a source ID, and a destination ID.

5. The method of claim 1, wherein the path registration request message includes at least one of an MBS zone IDentifier (ID), an R6 multicast Internet Protocol (IP) address, Multicast Connection IDs (MCIDs) corresponding to the MBS zone ID, a Generic Routing Encapsulation (GRE) key, a broadcast service start/end time, air scheduling information for each MBS zone, air scheduling information for each MCID, air scheduling information for an MBS MAP message, a network element address on which a base station is to perform an IGMP join and leave operation, a transmission type, a source ID, and a destination ID.

6. A method for providing a broadcasting service in a cellular network, the method comprising:

one of multicasting and unicasting a broadcast packet from the broadcast server to the ASN_GW by use of an R3 broadcast channel Internet Protocol (IP) address at the start of MBS data delivery;

packetizing, by the ASN_GW, a received broadcast packet in accordance with a burst size of a wireless section to generate a Media Access Control (MAC) Service Data Unit (SDU);

time-stamping, by the ASN_GW, a broadcast absolute time with respect to the MAC SDU;

prefixing, by the ASN_GW, a GRE header to the MAC SDU to generate a tunneling packet;

prefixing, by the ASN_GW, an R6 multicast IP header to the tunneling packet to generate an IP packet;

multicasting, by the ASN_GW, the IP packet to base stations associated with the broadcast zone;

transmitting a session release request message from a broadcast server to an Access Service Network-GateWay (ASN_GW) to request a multicast connection release, when Multicast and Broadcast Service (MBS) data delivery is completed;

releasing, by the ASN_GW, a multicast connection between the broadcast server and the ASN_GW based on the information of the session release request message;

transmitting a path deregistration request message from the ASN_GW to at least one base station associated with a broadcast zone, to request MBS data path deregistration and air resource release;

releasing, by the base station, a multicast connection between the ASN_GW and the base station based on the information of the path deregistration request message;

transmitting a path deregistration response message from the base station to the ASN_GW in response to the path deregistration request message, after release of the multicast connection between the ASN_GW and the base station; and transmitting a session release response message from the ASN_GW to the broadcast server in response to the session release request message, wherein the session release response message includes information about a success or failure of path release for the base station.

7. The method of claim 6, wherein the session release request message includes at least one of an MBS zone IDentifier (ID) and Multicast Connection IDs (MCIDs) corresponding to the MBS zone ID.

8. The method of claim 6, wherein the path deregistration request message includes at least one of a base station ID, an MBS zone ID, a Generic Routing Encapsulation (GRE) key, and Multicast Connection IDs (MCIDs) corresponding to the MBS zone ID.

9. A method for providing a broadcasting service in a cellular network, the method comprising:

transmitting a session modification request message from a broadcast server to an Access Service Network-GateWay (ASN_GW) after establishment of a path for a Multicast and Broadcast Service (MBS);

changing, by the ASN_GW, a parameter of a broadcast channel in response to the session modification request message;

transmitting a session modification response message from the ASN_GW to the broadcast server in response to the session modification request message;

transmitting a path modification request message from the ASN_GW to at least one base station associated with an MBS zone serving the broadcast channel;

transmitting a path modification response message from the base station to the ASN_GW in response to the path modification request message, to change the parameter of the broadcast channel;

transmitting a session modification response message from the ASN_GW to the broadcast server in response to the session modification request message; and packetizing, by the ASN_GW, a received broadcast packet in accordance with a burst size of a wireless section to generate a Media Access Control (MAC) Service Data Unit (SDU), wherein the session modification response message includes information about a success or failure of path modification for the base station.

10. A method for operating an Access Service Network-GateWay (ASN_GW) for a broadcasting service in a cellular network, the method comprising:

receiving a session start request message from a broadcast server before delivery of Multicast and Broadcast Service (MBS) data;

establishing a multicast connection between the broadcast server and the ASN_GW based on the information of the session start request message;

transmitting a path registration request message to at least one base station associated with a broadcast zone after establishment of the multicast connection, to request MBS data path establishment and air resource reservation;

receiving a path registration response message, which notifies data path establishment between the base station and the ASN_GW, from the base station;

transmitting a session start response message to the broadcast server in response to the session start request message;

receiving a broadcast packet from the broadcast server at the start of MBS data delivery;

packetizing the received broadcast packet in accordance with a burst size of a wireless section to generate a Media Access Control (MAC) Service Data Unit (SDU)

time-stamping a broadcast absolute time with respect to the MAC SDU;

prefixing a Generic Routing Encapsulation (GRE) header to the MAC SDU to generate a tunneling packet;

prefixing an R6 multicast IP header to the tunneling packet to generate an IP packet; and multicasting the IP packet to base stations associated with the broadcast zone, wherein the session start response message includes information about a success or failure of data path establishment between the base station and the ASN_GW.

11. The method of claim 10, wherein the multicast connection between the broadcast server and the ASN_GW and the multicast connection between the ASN_GW and the base station are performed through an Internet Group Management Protocol (IGMP) join operation, the data path establishment between the broadcast server and the ASN_GW is performed on a content-by-content basis, and the data path establishment between the ASN_GW and the base station is performed on a broadcast zone-by-broadcast zone basis.

12. The method of claim 10, wherein the session start request message includes at least one of an MBS zone IDentifier (ID), an R3 broadcast channel Internet Protocol (IP) address, [R3 broadcast channel IP vs. MBS zone ID and Multicast Connection ID (MCID)] mapping information, MCIDs corresponding to the MBS zone ID, a broadcast service start/end time, air scheduling information for each MBS zone, air scheduling information for each MCID, air scheduling information for an MBS MAP message, a network element address on which an ASN_GW is to perform an IGMP join and leave operation, a transmission type, a source ID, and a destination ID.

13. The method of claim 10, wherein the path registration request message includes at least one of an MBS zone IDentifier (ID), an R6 multicast Internet Protocol (IP) address, Multicast Connection IDs (MCIDs) corresponding to the MBS zone ID, a Generic Routing Encapsulation (GRE) key, a broadcast service start/end time, air scheduling information for each MBS zone, air scheduling information for each MCID, air scheduling information for an MBS MAP message, a network element address on which a base station is to perform an IGMP join and leave operation, a transmission type, a source ID, and a destination ID.

14. The method of claim 10, further comprising:

receiving a session release request message from the broadcast server, when the MBS data delivery is completed;

releasing the multicast connection between the broadcast server and the ASN_GW based on the information of the session release request message;

transmitting a path deregistration request message to at least one base station associated with a broadcast zone after release of the multicast connection, to request MBS data path deregistration and air resource release;

receiving a path deregistration response message, which notifies the deregistration of the data path between the base station and the ASN_GW, from the base station; and transmitting a session release response message to the broadcast server in response to the session release request message, wherein the session release response message includes information about a success or failure of path deregistration between the base station and the ASN_GW.

15. The method of claim 10, further comprising:

receiving a session modification request message from the broadcast server after establishment of a path for an MBS;

changing a parameter of a broadcast channel based on information of the session modification request message;

transmitting a path modification request message to at least one base station associated with a broadcast zone serving the broadcast channel after the change of the parameter information;

receiving a path modification response message, which notifies of the change of the parameter information of the broadcast channel, from the base station; and transmitting a session release response message to the broadcast server in response to the session modification request message, wherein the session release response message includes information about a success or failure of parameter change for the broadcast channel.

16. An apparatus for an Access Service Network-GateWay (ASN_GW) for a broadcast service in a cellular network, the apparatus comprising:
a first interface for communicating with a broadcast server;
a second interface for communicating with a base station;
a controller for controlling the first interface to establish a multicast connection between the broadcast server and the ASN_GW upon receipt of a session start request message from the broadcast server, for transmitting a session start response message to the broadcast server, for controlling the second interface to transmit a path registration request message to base stations associated with a broadcast zone, for receiving a path registration response message, which notifies the establishment of a data path between the base station and the ASN_GW, from the base stations, and for transmitting a session start response message to the broadcast server in response to the session start request message;
a buffer for storing a broadcast packet received from the first interface in an Multicast Connection ID (MCID) queue of broadcast zones;
a packet synchronizer for packetizing the broadcast packet stored in the MCID queue in accordance with a burst size of a wireless section to generate a Media Access Control (MAC) Service Data Unit (SDU);
a tunneling packet generator for time-stamping a broadcast absolute time with respect to the MAC SDU, and for prefixing a GRE header to the MAC SDU to generate a tunneling packet,
wherein the second interface prefixes an R6 multicast IP header to the tunneling packet to generate an IP packet, and multicasts the IP packet to base stations associated with the broadcast zone, and
wherein the buffer stores the broadcast packet received from the first interface in the MCID queue of the broadcast zones by use of an R3 broadcast channel Internet Protocol (IP) address,
wherein the session start response message includes information about a success or failure of path establishment for the base station.

17. The apparatus of claim 16, wherein the multicast connection between the broadcast server and the ASN_GW and the multicast connection between the ASN_GW and the base station are performed through an Internet Group Management Protocol (IGMP) join operation, the data path establishment between the broadcast server and the ASN_GW is performed on a content-by-content basis, and the data path establishment between the ASN_GW and the base station is performed on a broadcast zone-by-broadcast zone basis.

18. The apparatus of claim 16, wherein the session start request message includes at least one of an Multicast and Broadcast Service (MBS) zone IDentifier (ID), an R3 broadcast channel Internet Protocol (IP) address, [R3 broadcast channel IP address vs. MBS zone ID and Multicast Connection ID (MCID)] mapping information, MCIDs corresponding to the MBS zone ID, a broadcast service start/end time, air scheduling information for each MBS zone, air scheduling information for each MCID, air scheduling information for an MBS MAP message, a network element address on which an Access Service Network-Gateway (ASN_GW) is to perform an IGMP join and leave operation, a transmission type, a source ID, and a destination ID.

19. The apparatus of claim 16, wherein the path registration request message includes at least one of an Multicast and Broadcast Service (MBS) zone IDentifier (ID), an R6 multicast Internet Protocol (IP) address, Multicast Connection IDs (MCIDs) corresponding to the MBS zone ID, a Generic Routing Encapsulation (GRE) key, a broadcast service start/end time, air scheduling information for each MBS zone, air scheduling information for each MCID, air scheduling information for an MBS MAP message, a network element address on which a base station is to perform an IGMP join and leave operation, a transmission type, a source ID, and a destination ID.

20. The apparatus of claim 16, wherein the controller controls the first interface to release the multicast connection between the broadcast server and the ASN_GW upon receipt of a session release request message from the broadcast server, controls the second interface to transmit a path deregistration request message to base stations associated with a broadcast zone, receives a path deregistration response message, which notifies the deregistration of the data path between the base station and the ASN_GW, from the base stations, and transmits a session release response message to the broadcast server,
wherein the session release response message includes information about a success or failure of path deregistration between the base station and the ASN_GW.

21. The apparatus of claim 20, wherein the session release request message includes at least one of an Multicast and Broadcast Service (MBS) zone ID and Multicast Connection IDs (MCIDs) corresponding to the MBS zone ID, and the path deregistration request message includes at least one of a base station ID, an MBS zone ID, a Generic Routing Encapsulation (GRE) key, and MCIDs corresponding to the MBS zone ID.

22. The apparatus of claim 16, wherein the controller changes a parameter of a broadcast channel upon receipt of a session modification request message from the broadcast server, controls the second interface to transmit a path modification request message to base stations associated with a broadcast zone serving the broadcast channel, receives a path modification response message, which notifies of the parameter change of the broadcast channel, from the base stations, and controls the first interface to transmit a session modification response message to the broadcast server,
wherein the session start response message includes information about a success or failure of parameter change for the broadcast channel.

* * * * *